United States Patent
Park

(10) Patent No.: US 7,602,689 B2
(45) Date of Patent: Oct. 13, 2009

(54) RECORDING MEDIUM, AND METHOD AND APPARATUS FOR RECORDING DATA IN THE SAME

(75) Inventor: Sung Wan Park, Suwon-si (KR)

(73) Assignee: LG Electronics, Inc., Seoul (KR)

( * ) Notice: Subject to any disclaimer, the term of this patent is extended or adjusted under 35 U.S.C. 154(b) by 895 days.

(21) Appl. No.: 11/152,057

(22) Filed: Jun. 15, 2005

(65) Prior Publication Data

US 2005/0280912 A1 Dec. 22, 2005

Related U.S. Application Data

(60) Provisional application No. 60/580,381, filed on Jun. 18, 2004.

(30) Foreign Application Priority Data

Jun. 9, 2005 (KR) ...................... 10-2005-0049469

(51) Int. Cl.
*G11B 7/00* (2006.01)
(52) U.S. Cl. .................................................. 369/59.25
(58) Field of Classification Search ........................ None
See application file for complete search history.

(56) References Cited

U.S. PATENT DOCUMENTS

| | | | |
|---|---|---|---|
| 7,266,064 B2* | 9/2007 | Hwang et al. | 369/53.15 |
| 2002/0145966 A1* | 10/2002 | Hirotsune et al. | 369/275.3 |
| 2003/0137910 A1* | 7/2003 | Ueda et al. | 369/47.14 |

* cited by examiner

*Primary Examiner*—Joseph H Feild
*Assistant Examiner*—Joseph Haley
(74) *Attorney, Agent, or Firm*—Harness, Dickey & Pierce, P.L.C.

(57) ABSTRACT

A recording medium, and a method and apparatus for recording data in the same are disclosed. The method for recording data in a write-once recording medium includes the steps of (a) allocating a plurality of record areas to a user data area contained in the recording medium, (b) recording file system information in a first record area from among the plurality of record areas, and changing the first record area to an unrecordable area, (c) recording user data in a second record area from among the plurality of record areas, and (d) recording file entry (FE) information capable of managing the user data recorded in the second record area in a third record area from among the plurality of record areas. Therefore, the recording medium can be efficiently used, and a preferred data record method is provided.

23 Claims, 7 Drawing Sheets

- DMA : Disc Management Area
- TDMA : Temporary Disc Management Area
- ISA : Inner Spare Area
- OSA : Outer Spare Area

- TDFL : Temporary Defect List
- TDDS : Temporary Disc Definition structure
- SRRI : Sequential Recording Range Information

FIG. 5

| $b_{63}$ | $b_{62} \cdots b_{60}$ | $b_{59}$ | $\cdots$ | $b_{32}$ | $b_{31}$ | $b_{28}$ | $b_{27}$ | $\cdots$ | $b_0$ |
|---|---|---|---|---|---|---|---|---|---|
| SRR type | reserved | \multicolumn{4}{c|}{Start PSN of the SRR#i} | \multicolumn{2}{c|}{reserved} | \multicolumn{2}{c|}{LRA in the SRR #i} |

0b : LOW SRR
1b : no LOW SRR

RECORDING MEDIUM, AND METHOD AND APPARATUS FOR RECORDING DATA IN THE SAME

This application claims the benefit of Korean Patent Application No. 10-2005-0049469, filed on Jun. 9, 2005, which is hereby incorporated by reference as if fully set forth herein.

This application claims the benefit of U.S. Provisional Application No. 60/580,381, filed on Jun. 18, 2004, in the name of inventor Sung Wan PARK, entitled "NEW RECORDING METHOD FOR NEXT GENERATION WRITE-ONCE MEDIA", which is hereby incorporated by reference as if fully set forth herein.

BACKGROUND OF THE INVENTION

1. Field of the Invention

The present invention relates to a recording medium, and a method and apparatus for recording data in the same, and more particularly, to a method for recording data in a write-once recording medium.

2. Discussion of the Related Art

Generally, there has been widely used an optical disc acting as a recording medium capable of recording a large amount of data therein. Particularly, there has been newly developed a high-density optical recording medium capable of recording/storing high-quality video data and high-quality audio data for a long period of time, for example, a Blu-ray Disc (BD).

The BD acting as the next-generation recording medium has been considered to be the next-generation optical recording solution capable of recording/storing much more data than a conventional DVD. In recent times, the international standard technical specification associated with the BD has been established along with those of other digital devices.

Although many developers have conducted intensive research into a write-once BD-R disc as the technical standard of the BD, the technical standard for the write-once BD-R has not yet been established, so that the developers have difficulty in developing the completed optical recording/reproducing apparatus.

SUMMARY OF THE INVENTION

Accordingly, the present invention is directed to a recording medium, and a method and apparatus for recording data in the same that substantially obviate one or more problems due to limitations and disadvantages of the related art.

An object of the present invention is to provide a method and apparatus for recording data in a write-once recording medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for recording data in a recording medium includes the steps of (a) allocating a plurality of record areas to a user data area contained in the recording medium, (b) recording file system information in a first record area from among the plurality of record areas, and changing the first record area to an unrecordable area, (c) recording user data in a second record area from among the plurality of record areas, and (d) recording file entry (FE) information capable of managing the user data recorded in the second record area in a third record area from among the plurality of record areas.

In another aspect of the present invention, a method for recording data in a recording medium includes the steps of (a) allocating four or more open SRRs (Sequential Recording Ranges) to a user data area contained in the recording medium, (b) recording file system information including volume structure information in a first SRR from among the allocated SRRs, and changing the first SRR to a closed SRR, (c) recording user data in a second SRR from among the allocated SRRs, (d) recording file entry (FE) information capable of managing the user data recorded in the second SRR in a third SRR from among the allocated SRRs, and (e) recording an AVDP (Anchor Volume Descriptor Pointer) in a fourth SRR from among the allocated SRRs, and changing the fourth SRR to a closed SRR.

In another aspect of the present invention, a method for recording data in a recording medium includes the steps of (a) allocating a plurality of record areas to a user data area, (b) recording file system information including volume structure information in a first record area from among the allocated record areas, and changing the first record area to an unrecordable area, (c) maintaining a second record area and a third record area in a reserved state in order to record/manage user data, and (d) if a command for recording the user data occurs, recording the user data in the second record area, and recording file entry information for managing the user data recorded in the second record area in the third record area.

In another aspect of the present invention, an apparatus for recording data in a recording medium including at least three records areas, i.e., a first record area, a second record area, and a third record area includes a controller for generating a data record command in the second record area, and a recording/reproducing unit for receiving the data record command from the controller, recording user data in the second record area, and recording file entry (FE) information capable of managing the user data recorded in the second record area in the third record area, wherein the controller controls the recording/reproducing unit to record file system information including volume structure information in the first record area before the data record command is generated in the second record area.

In another aspect of the present invention, an apparatus for recording data in a recording medium including at least four open SRRs (Sequential Recording Ranges), i.e., a first SRR, a second SRR, a third SRR, and a fourth SRR, includes a controller for generating a data record command in the second SRR, and a recording/reproducing unit for receiving the data record command from the controller, recording user data in the second SRR, and recording file entry (FE) information capable of managing the user data recorded in the second SRR in the third SRR, wherein the controller controls the recording/reproducing unit to record file system information in the first and fourth SRRs before the data record command is generated in the second SRR.

In a further aspect of the present invention, a recording medium including a user data area and a management area, includes the user data area in which a plurality of record areas can be allocated, wherein a first record area from among the allocated record areas records file system information including volume structure information, a second record area from among the allocated record areas records user data, and a third record area from among the allocated record areas records file entry information for managing the user data recorded in the second record area, and the management area including a TDMA (Temporary Disc Management Area) capable of recording management information associated with a plurality of record areas allocated to the user data area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 shows a method for recording an SSR entry acting as management information capable of managing an SSR allocated to a recording medium according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, a magnetic disc, and a magnetic tape, etc.

For the convenience of description and better understanding of the present invention, the optical disc will hereinafter be exemplarily used as the above-mentioned recording medium in the present invention.

The term "SRR" (Sequential Recording Range) is indicative of a recording area allocated to a write-once optical disc such as a BD-R so that specific data is recorded in the recording area. For example, the SRR may also be called a track.

Figure 1:
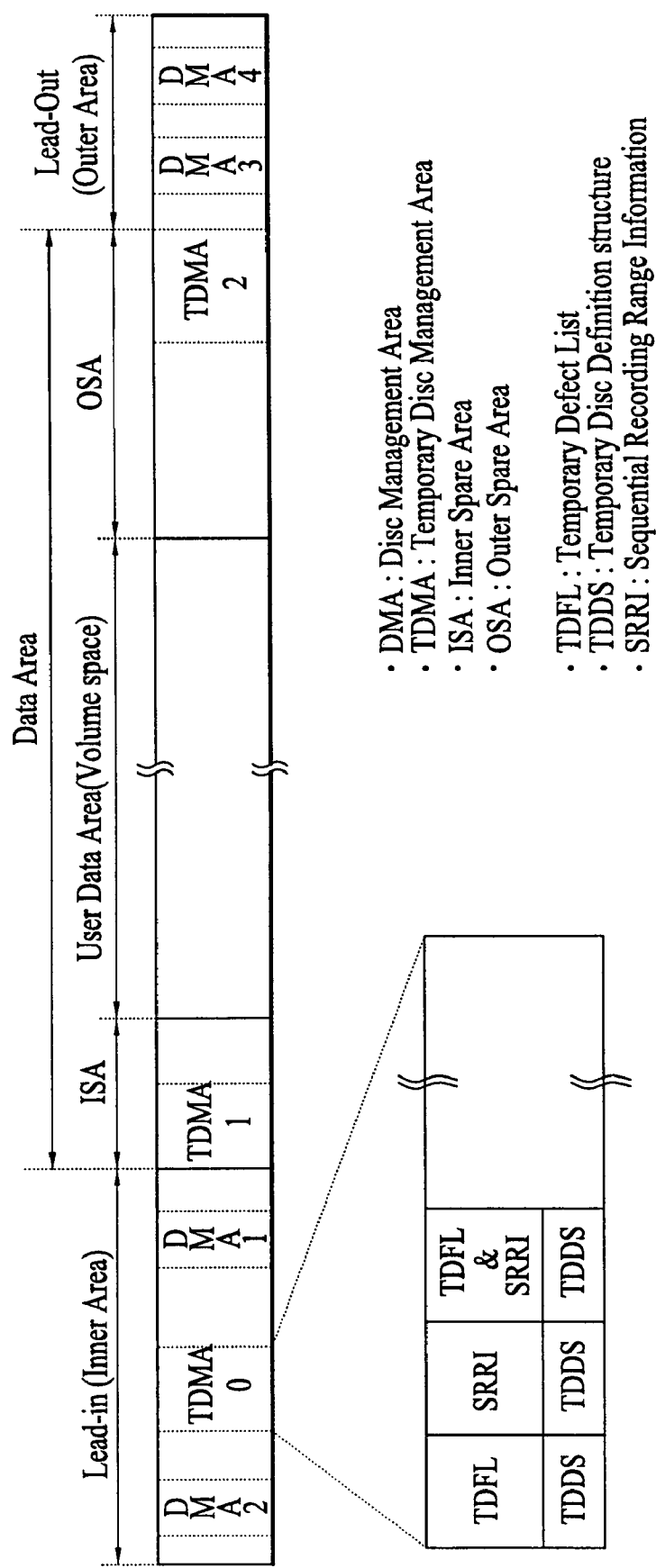
FIG. 1 shows a physical area of a write-once recording medium according to the present invention.

FIG. 1 shows a physical area of a write-once recording medium according to the present invention. For example, a single layer structure of a write-once BD-R is shown in FIG. 1.

The write-once optical disc includes a Lead-in area, a data area, and a Lead-out area. The Lead-in area, the data area, and the Lead-out area are sequentially arranged in an inner area of the write-once optical disc. Particularly, the data area includes a user data area in which real user data is recorded, an ISA (Inner Spare Area), and an OSA (Outer Spare Area). The ISA and the OSA are adjacent to the user data area, and are adapted to perform defect management or a logical overwrite function.

A TDMA (Temporary Disc Management Area) is included in each of the Lead-in area, the ISA, and the OSA. Management information generated prior to disc finalization or disc closing is recorded in the TDMA.

A plurality of DMAs (Disc Management Areas) are included in each of the Lead-in area and the Lead-out area.

Particularly, the TDMA is largely classified into first and second TDMAs "TDMA0" and "TDMA2". The first TDMA "TDMA0" has a fixed size (e.g., 2048 clusters) in a Lead-in area, is always allocated to the disc during disc initialization, and is firstly used. The second TDMA "TDMA2" is allocated to a spare area to have a variable size, and its allocation or non-allocation is determined during disc initialization. If the second TDMA "TDMA2" is completely used during the allocation, a third TDMA "TDMA1" contained in the ISA and a fourth TDMA "TDMA2" contained in the OSA are found. The third TDMA "TDMA1" is secondly used, and the fourth TDMA "TDMA2" is thirdly used.

Disc management information is recorded in the above-mentioned TDMAs "TDMA1~TDMA2". A variety of types of management information recorded in the TDMAs of a write-once optical disc are shown in a lower part of FIG. 1. In other words, the same management information will be recorded in the above-mentioned TDMAs TDMA0~TDMA2, and FIG. 1 shows a specific case in which the above-mentioned management information is recorded in the TDMA "TDMA0".

Disc management information recorded in the TDMA is classified into first to third disc management information. The first management information acting as defect management information is indicative of a TDFL (Temporary Defect List) for recording the list of defects to manage a defective area of the disc. The second management information is SRRI (Sequential Recording Range Information) indicative of a recording state of an SRR allocated to the disc during a sequential recording mode. The third management information is TDDS (Temporary Disc Definition Structure), which includes a pointer capable of designating position information of the latest TDFL and SRRI, and records a variety of information necessary for the disc. If a disc recording scheme is a random recording mode, an SBM (Space Bit-Map) instead of the SRRI is recorded in the disc.

The above-mentioned management information will be recorded in the TDMAs whenever an update is required during a disc use time. Otherwise, if a recordable user data area or a recordable TDMA is not left in the disc any more, or if a user does not want to record data in the disc any more, disc finalization or disc closing is performed. In this case, the last management information from among a plurality of management information recorded in the above-mentioned TDMA is delivered to the above-mentioned DMA, and is then recorded in the DMA.

SRR type information allocated to the disc for the sequential recording mode in the write-once optical disc and a recording method using the SRR type information will hereinafter be described in detail.

Figure 2:
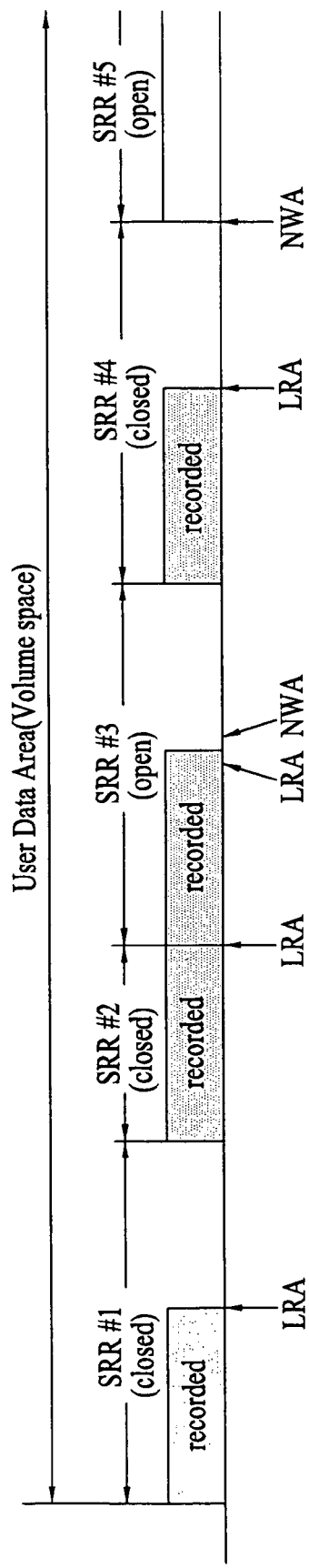
FIG. 2 shows a recording area (e.g., an SRR) for use in a method for allocating a recording area (e.g., an SRR) to a recording medium and recording data in the recording medium according to the present invention.

FIG. 2 shows the recording area (e.g., the SRR) allocated to the write-once optical disc so that data can be recorded in the write-once optical disc according to the present invention.

Referring to FIG. 2, the SRR is classified into first and second SRRs. The first SRR is an open SRR in which data can be recorded. The second SRR is a closed SRR in which data cannot be recorded any more. In more detail, the open SRR is able to read a next writable address (NWA) indicative of the next recordable position contained in a corresponding SRR, but the closed SRR is indicative of an SRR incapable of reading the value of NWA. Each of all SRRs includes an LRA (Last Recorded Address) as the last recording position at which real data is recorded in a corresponding SRR. Therefore, the NWA can be predicted from the value of LRA in the open SRR.

All the SRRs allocated when a disc is initialized are open SRRs, but they are then changed to closed SRRs according to their use scheme. In other words, if the open SRRs are changed to the closed SRRs, data is completely recorded in overall areas of a corresponding open SRR, such that there is no more area capable of recording data in the corresponding open SRR. Otherwise, although the area capable of recording data exists in the above-mentioned open SRR, the open SRR may be compulsorily changed to a closed SRR by a system as necessary.

Referring to FIG. 2, although only some data is recorded in SRRs "SRR#1" and "SRR#4", the recorded data is compulsorily changed to a closed SRR. Referring to an SRR (SRR#2), if data is completely recorded in all areas of the SRR (SRR#2), there is no more area capable of recording data in the SRR (SRR#2), such that the SRR (SRR#2) is changed to the closed SRR.

Referring to an SRR (SRR#3) in FIG. 2, some data is recorded in the SRR (SRR#3), an area capable of recording data exists in the SRR (SRR#3), such that the SRR (SRR#3) is an open SRR. An SRR (SRR#5) in FIG. 2 does not record data therein, so that it is an open SRR in an initial state.

A maximum of 16 SRRs are simultaneously allocated to a write-once BD-R, so that the above-mentioned open SRRs can be differently used according to disc use purposes.

The present invention is characterized in that a method for recording data in the write-once BD-R using the above-mentioned open SRRs, and a detailed description thereof will hereinafter be described with reference to FIGS. 3~7.

Figure 3:
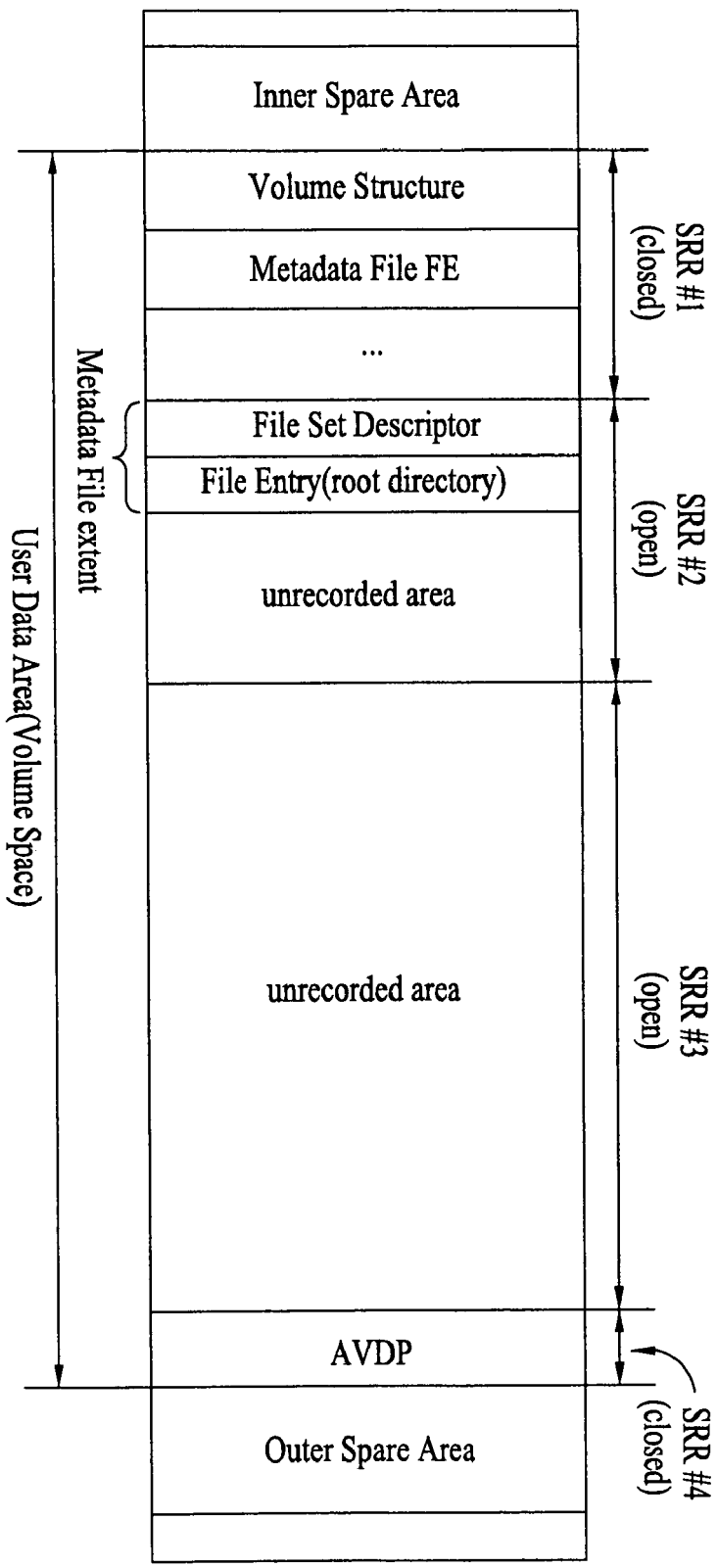
FIGS. 3 and 4 show exemplary methods for allocating a recording area (e.g., an SRR) to a recording medium and recording data in the recording medium according to the present invention.
Figure 4:
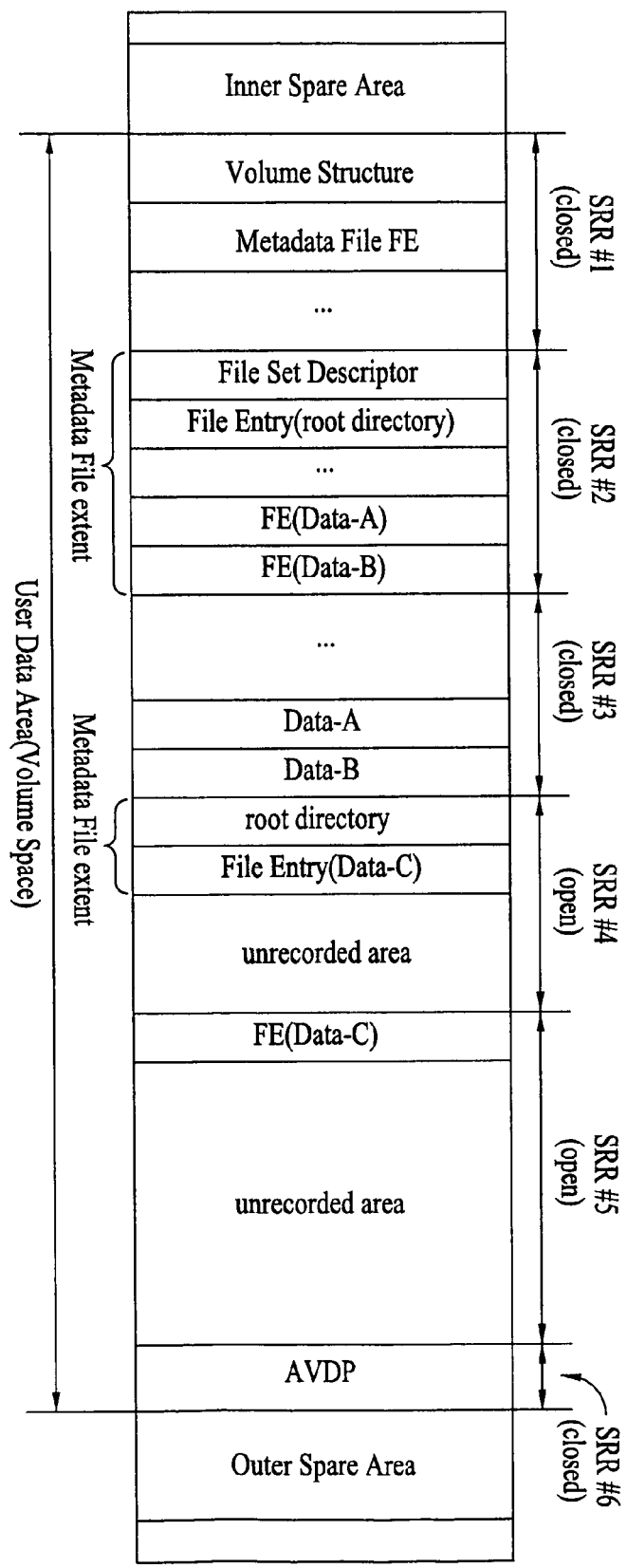

FIGS. 3 and 4 show exemplary methods for allocating a plurality of open SRRs to a recording medium and recording data in the recording medium according to the present invention. In more detail, FIG. 3 shows an example in which open SRRs are allocated to the recording medium such as a disc when the disc is formatted such that the disc is initialized. FIG. 4 shows an example in which a data recording operation is performed in the example of FIG. 3.

Referring to FIG. 3, a plurality of open SRRs are allocated to a user data area during the disc formatting operation. This allocation may be automatically and simultaneously performed by the apparatus of FIG. 6 described below. File system information including a volume structure is recorded in the first SRR (SRR#1), and then the first SRR (SRR#1) is changed to a closed SRR. An AVDP (Anchor Volume Descriptor Pointer) is recorded in the fourth SRR (SRR#4) as file system information, and then the fourth SRR (SRR#4) is changed to a closed SRR. In this case, it is preferable that the first SRR (SRR#1) is positioned at the front end of the user data area and the fourth SRR (SRR#4) is positioned at the rear end of the user data area. The second SRR (SRR#3) and the third SRR (SRR#2) are maintained in a reserved state during which user data can be recorded or managed.

The third SRR (SRR#2) is used as an area capable of recording file entry (FE) information. Preferably, the third SRR (SRR#2) may pre-record a file set descriptor and FE information associated with a root directory, when the disc is initialized.

Thereafter, if a data record command occurs, user data is recorded in the second SRR (SRR#3), and FE information capable of managing a user data file recorded in the second SRR (SRR#3) is recorded in the third SRR (SRR#2).

FIG. 4 shows an example in which data is recorded in the second SRR (SRR#3) and the third SRR (SRR#2) after the data record command has been generated.

For example, if first and second data areas "Data-A" and "Data-B" used as user data files are completely recorded in the second SRR (SRR#3), a first file entry "FE(Data-A)" is recorded in the first data area "Data-A" in the third SRR (SRR#2), and a second file entry "FE(Data-B) is recorded in the second data area "Data-A" in the third SRR (SRR#2).

As shown in FIG. 4, if the data areas are completely recorded in the second SRR (SRR#3) and the third SRR (SRR#2), the second SRR (SRR#3) and the third SRR (SRR#2) are changed to closed SRRs, respectively. Then, new open SRRs, i.e., a fifth SRR (SRR#5) and a sixth SRR (SRR#4) are allocated to the user data area.

The SRRs allocated to the user data area are assigned predetermined SRR numbers (denoted by #-series) sequentially arranged from a disc inner area. If a new open SRR is allocated to the user data area, old SRR numbers denoted by #-series may also be changed to other numbers as necessary.

For example, FIG. 4 shows an example in which a new open SRR is allocated to the SRR (SRR#3) shown in FIG. 3. Therefore, the old open SRR (SRR#3) shown in FIG. 3 is divided into a closed SRR (SRR#3), an open SRR (SRR#4), and the other open SRR (SRR#5). Also, the old closed SRR (SRR#4) is changed to a new closed SRR (SRR#6).

Thereafter, user data (e.g., "Data-C") is continuously recorded in the fifth SRR (SRR#5). FE information "FE (Data-C)" for managing data "Data-C" recorded in the fifth SRR (SRR#5) is recorded in the sixth SRR (SRR#4).

In the above-mentioned methods for recording data in the write-once optical disc as shown in FIGS. 3 and 4, a logical overwrite (LOW) scheme will hereinafter be described.

The LOW scheme is one of a variety of data record methods for use in a high-density write-once optical disc such as a BD. In more detail, although data cannot be physically and repeatedly recorded in the same area, the LOW scheme allows the data to be logically repeatedly recorded in the same area.

For example, assuming that data is recorded in the disc as shown in FIG. 4, if a record command for recording new data in a first disc area where data is completely recorded, is applied to the SRRs (SRR#1~SRR#6), an optical recording/reproducing apparatus records the above-mentioned data in a second disc area acting as a substitute for the above-mentioned first disc area, and records position information of the above-mentioned second disc area and position information of the first disc area equal to an initial record request area in the TDMA. In this case, the above-mentioned position information is recorded as management information in the TDMA. As a result, the user can recognize that data is overwritten in a desired area.

When performing the above-mentioned LOW scheme, the present invention may include the following examples.

In the case of a first example, the above-mentioned substitution record area is indicative of a spare area or an NWA position of the open SRR. For example, if disc initialization is performed as denoted by SRR#1 and SRR#6 in FIG. 4, the SRR for recording file system information may be replaced with a spare area, and may be recorded at the NWA position of the open SRR in the SRRs (SRR#2~SRR#5) of FIG. 4.

A second example is characterized in that it allows the LOW scheme to be available in only a specific SRR. In more detail, if disc initialization is performed as denoted by SRR#1 and SRR#6 in FIG. 4, the second example may determine only a specific SRR for recording file system information to be a LOW available area.

According to the above-mentioned examples, in the case of an SRR capable of recording FE (File Entry) data as shown in the SRRs (SRR#2 and SRR#4), the number of recording times of data recorded in a corresponding SRR is very high, so that the LOW operation may be prohibited. Otherwise, although the LOW operation is permitted, the substitution record area may be allocated to an NWA position nearest to a desired initial area, such that the optical recording/reproducing apparatus may have less operation load.

FIG. 5 shows a method for recording an SSR entry acting as management information capable of managing an SSR allocated to a recording medium according to the present invention.

FIG. 5 shows a single SRR entry structure. According to the present invention, each SRR includes a single SRR entry, such that all the SRR entries are recorded as the SRRI of FIG. 1 in the TDMA.

The SRR entry structure will hereinafter be described. The SRR entry includes 64 bits. First 28 bits from among the 64 bits are used as a field "Start PSN of the SRR#i" (b59~b28) capable of designating disc position information of a corresponding SRR. Second 28 bits from among the 64 bits are used as a field "LRA in the SRR#i" (b27~b0) capable of designating position information of user data finally recorded in a corresponding SRR. The remaining 8 bits can be used as information indicative of a status of the SRR in various ways.

Particularly, the present invention is characterized in that SRR type information associated with the LOW is recorded in the SRR entry.

For example, a first 1 bit (b63) in the SRR is used as flag information. If a corresponding flag value is a predetermined value of 0b, an SRR capable of performing the LOW operation is determined. Otherwise, if a corresponding flag value is a predetermined value of 1b, an SRR incapable of performing the LOW operation is determined. Therefore, each SSR can indicate whether the LOW operation is permitted or not.

For example, provided that the LOW operation is permitted in the SRRs "SRR#1" and "SRR#6" shown in FIG. 4, the flag information contained in a corresponding SRR entry may be set to the value of "0b". Provided that the LOW operation is not permitted in the SRRs "SRR#2" and "SRR#5" shown in FIG. 4, the flag information contained in a corresponding SRR entry may be set to the value of "1b".

Figure 6:
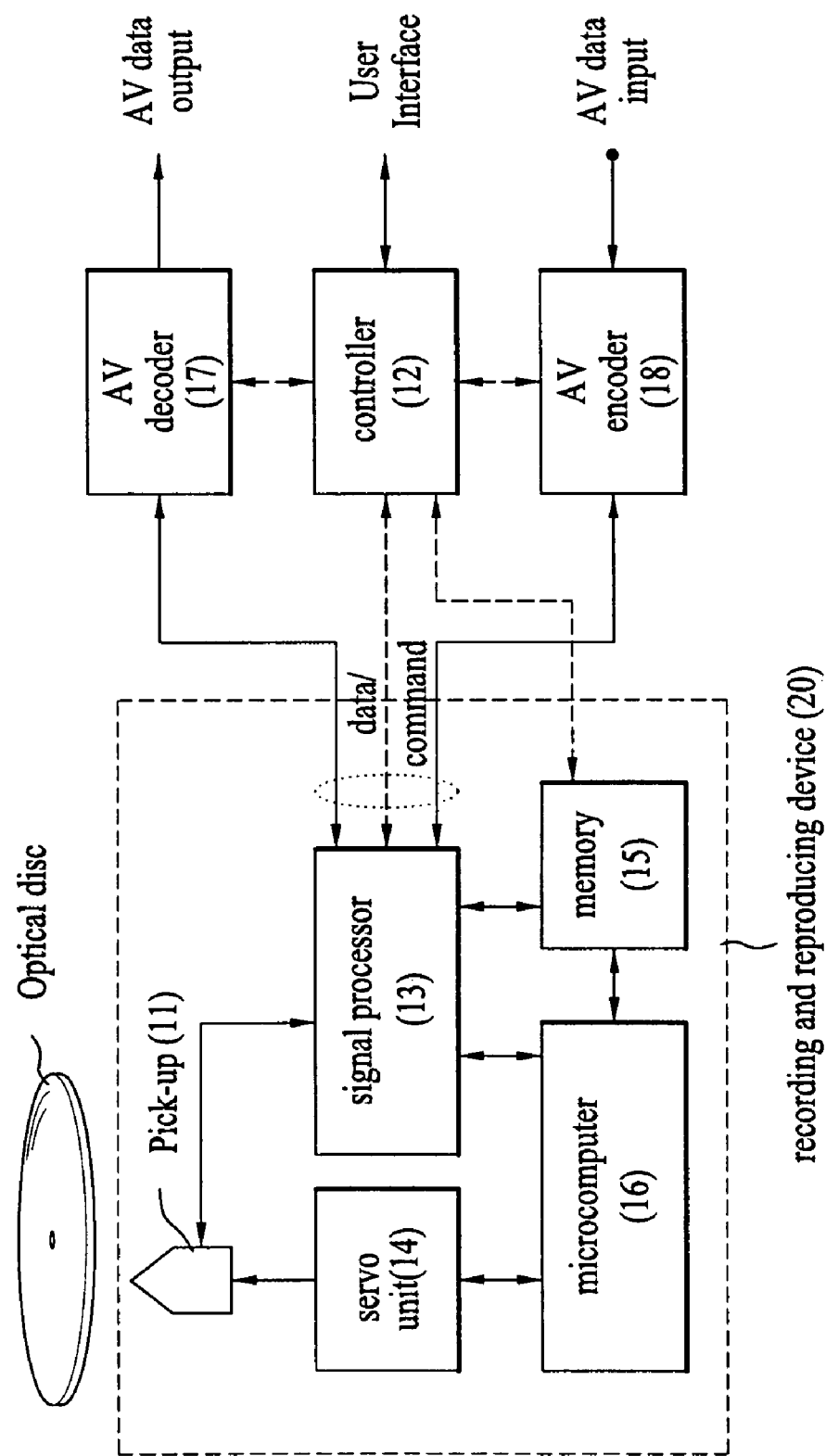
FIG. 6 is a block diagram illustrating an optical recording/reproducing apparatus according to the present invention.

FIG. 6 is a block diagram illustrating an optical recording/reproducing apparatus according to the present invention. Referring to FIG. 6, the optical recording/reproducing apparatus largely includes a recording/reproducing unit 20 and a controller 12.

The recording/reproducing unit 20 includes an optical pickup unit 11 for reading data and management information recorded in an optical disc; a servo unit 14 for controlling the optical pickup unit 11; a signal processor 14 for restoring a reproduction signal received from the optical pickup unit 11 to a desired signal value, or modulating a signal to be recorded into a signal recorded in the optical disc, such that it transmits the restored or modulated result to the optical pickup unit 11; a memory 15 for temporarily storing the management information read from the optical disc; and a microprocessor 16 for controlling the above-mentioned operations. Particularly, a manufactured product composed of only the recording/reproducing unit 20 is called a drive.

The controller 12 is adapted to control overall operations of the optical recording/reproducing apparatus, receives a command from a user by interfacing with the user, and transmits the received command to the microprocessor 16 contained in the recording/reproducing unit 20, such that it allows the optical recording/reproducing apparatus to perform operations associated with the user command. Particularly, the controller 12 generates a recording/reproducing command using disc management information received from the recording/reproducing unit 20, and then transmits the recording/reproducing command to the recording/reproducing unit 20.

In association with the above-mentioned operations, an AV (Audio/Video) decoder 17 finally decodes output data upon receiving a control signal from the controller 12, and transmits the decoded output data to the user. An AV encoder 18 converts an input signal into a specific format signal upon receiving a control signal from the controller 12, and transmits the specific format signal to the signal processor 13 contained in the recording/reproducing unit 20, such that a desired signal can be recorded in the optical disc.

In the above-mentioned optical recording/reproducing apparatus, data recording operations according to the present invention will hereinafter be described with reference to FIG. 7.

Figure 7:
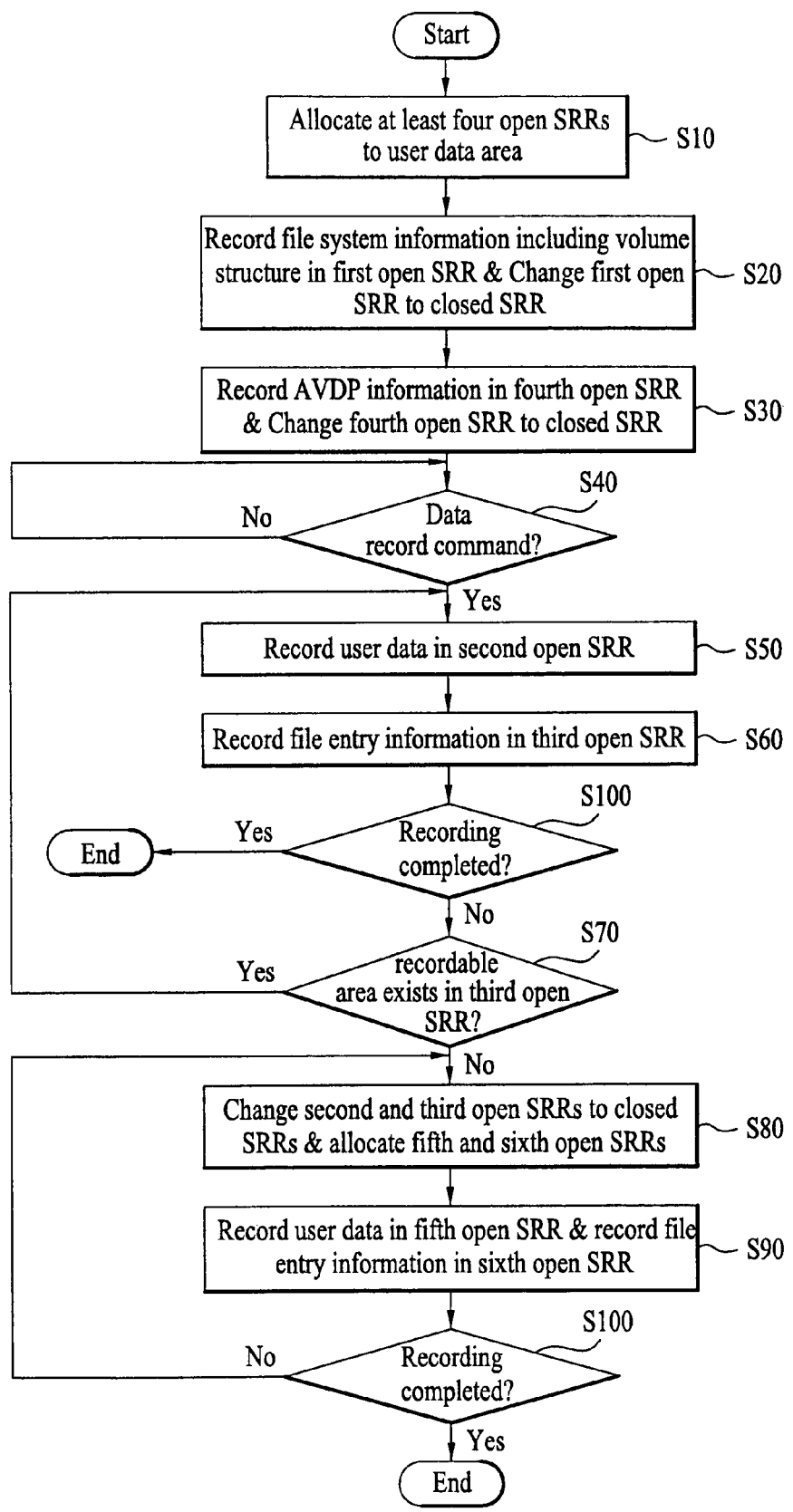
FIG. 7 is a flow chart illustrating a method for recording data in a recording medium using the optical recording/reproducing apparatus according to the present invention.

Referring to FIG. 7, if a disc is seated in the optical recording/reproducing apparatus, the microprocessor 16 contained in the recording/reproducing unit 20 performs an initialization operation to record data in the disc upon receiving a control signal from the controller 12. In other words, four or more open SRRs are allocated to the user data area at step S10. This allocation may be automatic and simultaneous. The microprocessor 16 records file system information including a volume structure in a first open SRR, and changes the first open SRR to a closed SRR at step S20. The microprocessor 16 records an AVDP in a fourth open SRR, and changes the fourth open SRR to a closed SRR at step S30.

Upon receiving a data record command from the controller 12 at step S40, the microprocessor 16 controls the optical pickup unit 11, such that data is recorded in the disc. In other words, the microprocessor 16 records user data in a second open SRR at step S50, and records FE information for managing user data recorded in the second open SRR in a third open SRR at step S60.

Thereafter, there is no more area capable of recording data in the above-mentioned third open SRR at step S70, the microprocessor 16 changes the third open SRR to a closed SRR, and allocates a new open SRR to the second open SRR. In more detail, some parts of the second open SRR having been previously used, i.e., user data record areas from among the second open SRR, are changed to a closed SRR, and the remaining non-record areas other then the user data record areas are newly assigned a fifth open SRR and a sixth open SRR at step S80.

User data is continuously recorded in the above-mentioned fifth open SRR, and FE information for managing user data recorded in the fifth open SRR is recorded in the sixth open SRR at step S90.

The above-mentioned steps S50~S90 are repeatedly performed until completing the recording operation at step S100. In more detail, if there is no more area capable of recording data in the sixth open SRR, new open SRRs (i.e., a seventh open SRR and an eighth open SRR) are allocated to the fifth open SRR, so that a method for successively recording data is established.

Also, after finishing the data recording operation for a specific area as described above, if the microprocessor 16 receives a record command for requesting the LOW operation associated with the specific area, the microprocessor 16 records the LOW-requested data in a disc spare area (or an NWA position of an open SRR) instead of the above-mentioned specific area, and records associated management information in a TDMA, as previously stated above.

As apparent from the above description, a method and apparatus for recording data in a recording medium according to the present invention can effectively use the recording medium, and can provide a user with a preferred data record method.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for recording data in a recording medium, comprising:
    allocating, by an apparatus, a plurality of record areas to a user data area contained in the recording medium;
    recording, by the apparatus, file system information in a first record area from among the plurality of record areas such that the first record area is used area;
    recording, by the apparatus, user data in a second record area from among the plurality of record areas;
    recording, by the apparatus, file entry (FE) information capable of managing the user data recorded in the second record area in a third record area from among the plurality of record areas such that the third record area is a used area when the file entry (FE) information substantially fills the third record area;
    allocating, by the apparatus, a fourth record area and a fifth record area to the second record area;
    recording, by the apparatus, user data in the fourth record area; and
    recording, by the apparatus, file entry information for the user data recorded in the fourth record area in the fifth record area.

2. The method according to claim 1, wherein the plurality of record areas are allocated when the recording medium is formatted.

3. The method according to claim 2, wherein the plurality of record areas are automatically and simultaneously allocated by the apparatus when the recording medium is formatted.

4. The method according to claim 1, further comprising:
    allocating a sixth record area from among the plurality of record areas, recording an AVDP (Anchor Volume Descriptor Pointer) in the sixth record area such that the sixth record area is used area.

5. The method according to claim 4, wherein the record areas are sequentially allocated from an inner area of the recording medium in an order of the first record area, the third record area, the second record area, fifth record area, the fourth record area, and the sixth record area.

6. The method according to claim 1, further comprising:
    upon receiving an overwrite command for recording specific data in a particular record area, in which data is completely recorded, contained in the first to third record areas, recording the specific data to be recorded in the particular record area in a substitute record area contained in the recording medium as a substitute for the particular record area.

7. The method according to claim 6, wherein the substitute record area a spare area.

8. The method according to claim 6, wherein the substitute record area is determined to be one of the second record area and the third record area, the determined record area including an area in which data can be recorded.

9. The method according to claim 1, wherein the record areas are SRRs (Sequential Recording Ranges).

10. The method according to claim 9, further comprising:
    recording SRR information (SRRI) for managing the allocated SRRs in a TDMA (Temporary Disc Management Area) contained in the recording medium.

11. The method according to claim 10, wherein the SRRI is configured in the form of a single SRR entry for each SRR, and the SRR entry includes specific information for indicating whether an overwriting operation is performed in a corresponding SRR.

12. An apparatus for recording data in a recording medium, comprising:
    a controller configured to generate a data record command in the second record area; and
    a recording/reproducing unit configured to receive the data record command from the controller,
    wherein the controller is configured to control the recording/reproducing unit to
    allocate a plurality of record areas to a user data area contained in the recording medium;
    record file system information in a first record area from among the plurality of record areas such that the first record area is a used area;
    record user data in a second record area from among the plurality of record areas;
    record file entry (FE) information capable of managing the user data recorded in the second record area in a third record area from among the plurality of record areas such that the third record area is a used area when the file entry (FE) information substantially fills the third record area;
    allocate a fourth record area and a fifth record area to the second record area;
    record user data in the fourth record area; and
    record file entry information for the user data recorded in the fourth record area in the fifth record area.

13. A recording medium, comprising:
    a user data area in which a plurality of record areas can be allocated, wherein the plurality of record area includes,
        a first record area storing file system information including volume structure information, the first record area being a used area:
        a second record area storing user data;
        a third record area storing file entry information for managing the user data recorded in the second record area, the third record area being a used area;
        a fourth record area storing user data; and
        a fifth record area storing file entry information for managing the user data recorded in the fourth record area,
    a management area including a TDMA (Temporary Disc Management Area) for recording management information associated with a plurality of record areas allocated to the user data area.

14. The apparatus according to claim 12, wherein the controller is further configured to control the recording/reproducing unit to allocate a sixth record area in the plurality of record areas and record an AVDP (Anchor Volume Desciptor Pointer) in the sixth record area such that the sixth record area a used area.

15. The apparatus according to claim 14, wherein the controller is configured to sequentially allocate the record areas from an inner area of the recording medium in an order of the first record area, the third record area, the second record area, fifth record area, the fourth record area, and the sixth record area.

16. The apparatus according to claim 12, wherein the record areas are SRRs.

17. The apparatus according to claim 16, wherein the controller is configured to control the recording/reproducing unit to record SRRI for managing the allocated SRRs in a TDMA contained in the recording medium.

18. The apparatus according to claim 17, wherein the SRRI is configured in the form of a single SRR entry for each SRR, and the SRR entry includes specific information for indicating whether an overwriting operation is performed in a corresponding SRR.

19. The recording medium according to claim 13, wherein the plurality of record area further includes a sixth record area storing an AVDP (Anchor Volume Desciptor Pointer), the sixth record area being an used area.

20. The recording medium according to claim 19, wherein the record areas are allocated from an inner area of the recording medium in an order of the first record area, the third record area, the second record area, fifth record area, the fourth record area, and the sixth record area.

21. The recording medium according to claim 13, wherein the record areas are SRRs.

22. The recording medium according to claim 21, wherein the TDMA stores SRRI for managing the allocated SRRs.

23. The recording medium according to claim 22, wherein the SRRI is configured in the form of a single SRR entry for each SRR, and the SRR entry includes specific information for indicating whether an overwriting operation is performed in a corresponding SRR.

* * * * *